(12) United States Patent
Kuczera et al.

(10) Patent No.: US 7,097,568 B2
(45) Date of Patent: Aug. 29, 2006

(54) SHIELDED SEALING SYSTEM FOR A CONSTANT VELOCITY JOINT

(75) Inventors: Ramon Christopher Kuczera, Clarkston, MI (US); Danny Lee Booker, Troy, MI (US); Lawrence Anthony Anastasia, Rochester, MI (US)

(73) Assignee: GKN Driveline North America, Inc, Auburn Hills, MI (US)

( * ) Notice: Subject to any disclaimer, the term of this patent is extended or adjusted under 35 U.S.C. 154(b) by 0 days.

(21) Appl. No.: 10/877,859

(22) Filed: Jun. 25, 2004

(65) Prior Publication Data

US 2005/0288108 A1    Dec. 29, 2005

(51) Int. Cl.
 *F16D 3/84* (2006.01)
(52) U.S. Cl. .................. 464/173; 464/175; 277/634
(58) Field of Classification Search ............... 464/173, 464/175; 403/50, 51, 134; 277/634, 635, 277/636, 637
See application file for complete search history.

(56) References Cited

U.S. PATENT DOCUMENTS

| | | | | |
|---|---|---|---|---|
| 1,167,695 A | * | 1/1916 | Huff | ............................ 464/175 |
| 2,426,701 A | * | 9/1947 | Miller, Jr. | ................... 464/173 |
| 2,432,803 A | * | 12/1947 | Rice | ............................ 464/175 |
| 3,583,244 A | * | 6/1971 | Teinert | ....................... 464/173 |
| 4,557,491 A | * | 12/1985 | Orain | ......................... 277/636 |
| 5,297,996 A | * | 3/1994 | Draga | ......................... 464/175 |
| 5,707,066 A | * | 1/1998 | Sugiura et al. | ............. 464/175 |
| 6,093,108 A | * | 7/2000 | Moulinet | .................... 464/173 |
| 6,579,187 B1 | * | 6/2003 | Ramey | ........................ 464/175 |

* cited by examiner

*Primary Examiner*—Aaron Dunwoody
(74) *Attorney, Agent, or Firm*—Jennifer M. Brumbaugh; Mick A. Nylander

(57) ABSTRACT

To protect a joint from exposure to contaminants and loss of lubricant disposed within a joint a traditional joint includes a sealing system. Typically the sealing system includes a boot and a boot cover. To produce a more effective joint, the sealing system of the present invention further includes a shield to protect the boot and the boot cover from exposure to contaminants by providing a barrier therebetween. The joint of the present invention includes a shield having several embodiments including an elastomer sleeve, a rigid cylindrical tube and a thermoplastic second boot.

10 Claims, 7 Drawing Sheets

SHIELDED SEALING SYSTEM FOR A CONSTANT VELOCITY JOINT

FIELD OF THE INVENTION

The present invention generally relates to joint having a sealing system, and more particularly relates to a joint having a shielded sealing system for preventing exposure of the sealing system to contaminants.

BACKGROUND

Joints are common components in today's automotive vehicles. Typically, joints are used for transmission of a rotating motion. When transmission of a rotating motion is desired at a generally constant velocity a constant velocity joint (CVJ) is utilized. Various styles of constant velocity joints are common and include ball-type fixed joints, tripod fixed joints, plunging ball joints, and the like. The various styles of joints are currently used in front-wheel drive vehicles, rear-wheel drive vehicles and on propeller shafts (propshafts) found in rear-wheel drive, all-wheel drive and four-wheel drive vehicles. The constant velocity joints are generally grease lubricated for life and sealed by a sealing system when used on propshafts. Therefore, constant velocity joints are sealed in order to retain grease inside the joint while keeping contaminants and foreign matter, such as dirt, water, and the like out of the joint. To achieve this protection the constant velocity joint usually includes a sealing system. The CVJ is usually enclosed at an open end of an outer race by a sealing boot and boot cover made of a rubber, thermoplastic, silicone type material, and the like. The opposite end of the outer race is generally enclosed by a dome or cap, commonly known as a grease cap. A monoblock or integral stem and race style joint is sealed at the opposite end by the internal geometry of the outer race. This sealing and protection of the constant velocity joint is necessary because contamination of the inner chamber of the joint generally will cause internal damage and destruction of the joint. Furthermore, once the inner chamber of the joint is partially filled and thus lubricated, it is generally lubricated for life.

A main function of a CVJ is the transmission of rotational forces. During operation, the constant velocity joint transmits torque. The torque transfer generates heat by the internal friction of the joint along with other transmission inefficiencies. Generally, as the speed and torque increase, the heat generation of the constant velocity joint also increases. A further effect of increased speeds is that the velocity of the grease increases because the internal action of the joint acts like a pump to causes the grease to be pumped out of the joint and into the sealing system. This phenomenon increases pressure on the sealing system. The high internal temperatures in the constant velocity joint also affect the lubricant grease, which is in contact with the sealing system. With higher temperatures the boot and boot cover of the sealing system become more vulnerable to cracking and rupture and the durability of the constant velocity joint that is generally sealed for life is reduced. Furthermore, heat that is generated within the sealing system is transferred to the outer race of the CVJ. As a result, premature cracks, ruptures and blowouts of the sealing system further reduce the life of the boot. With the heat affecting the life and material of the sealing system, the boot and boot cover are also more vulnerable to external damage due to strikes or blows by contaminants from the environment of the automotive vehicle. These contaminants can be anything from rocks, mud, road debris, or any other object capable of being thrown by the tires or deflected into the boot or boot cover of the sealing system of the constant velocity joint. These contaminants striking the boot will further reduce the sealability of the boot and boot cover while increasing the possibility of ruptures, blowouts, and the like. Accordingly, life of the constant velocity joint is ultimately reduced.

Therefore, there is a need in the art for a joint having a sealing system that is protected from contact with foreign objects found in the outside environment of the joint. The ability to protect the sealing system from external objects will reduce early deterioration of the boot and boot cover that may result in eventual failure of the sealing system and ultimate failure of the joint.

SUMMARY OF THE INVENTION

The inventors of the present invention have recognized these and other problems associated with joints having sealing systems. To this end, the inventors have developed a joint having a shielded sealing system to prevent exposure of the sealing system to contaminants.

Specifically, a joint receiving a shaft comprises a sealing system and a shield secured to the sealing system. The shield protects portions of the sealing system from exposure to contaminants.

BRIEF DESCRIPTION OF THE DRAWINGS

The present invention will now be described, by way of example, with reference to the accompanying drawings, in which.

DETAILED DESCRIPTION

Figure 1:
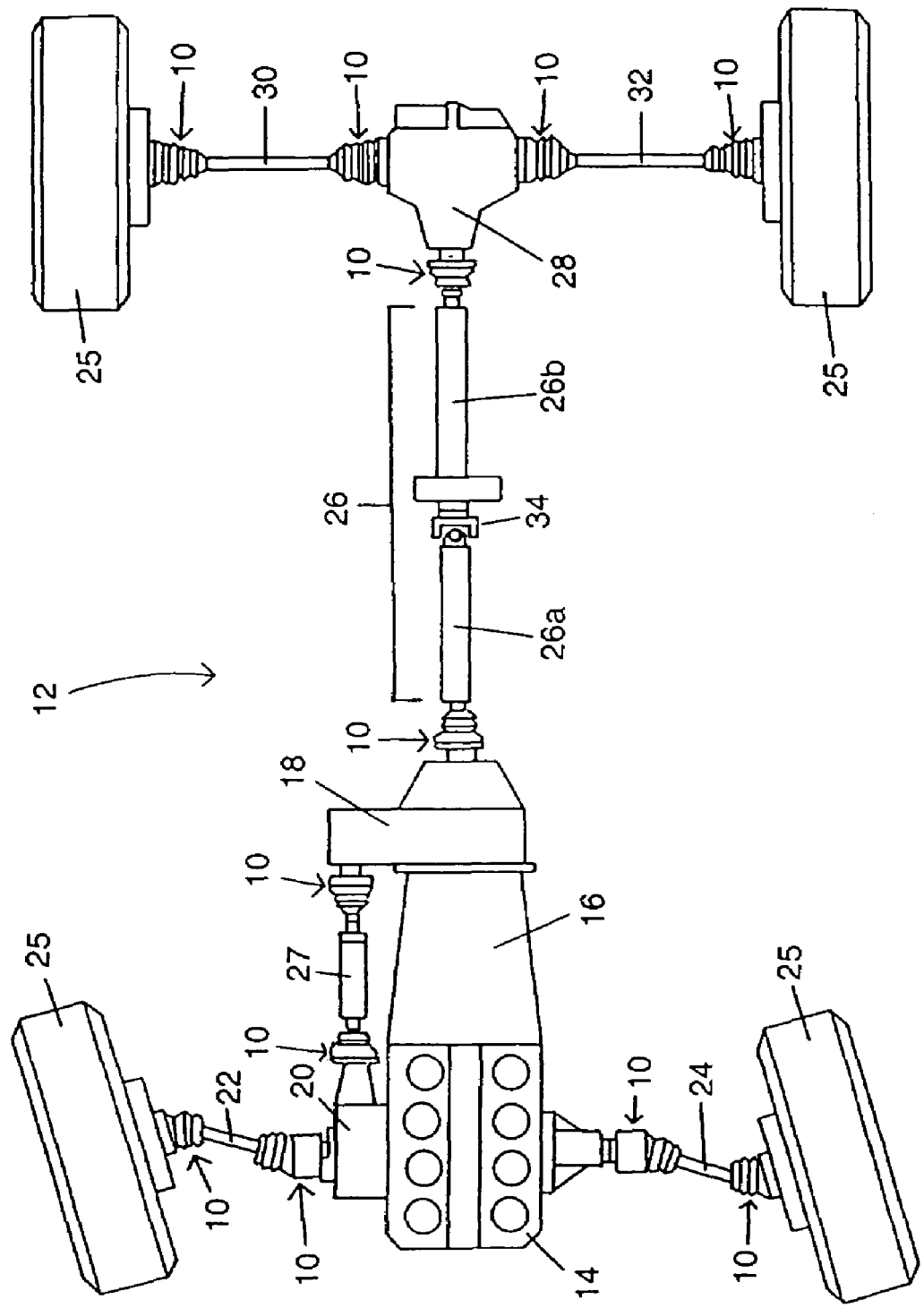
FIG. 1 is a plan view of a vehicle driveline system.

Referring to the drawings, a joint according to the present invention is generally shown at 10. Joint 10 may be any type of joint commonly referred to in the art as a constant velocity joint such as a fixed ball joint, tripod joint, plunging joint, and the like.

FIG. 1 illustrates a typical driveline 12 of an automotive vehicle. The driveline 12 of FIG. 1 is a typical all-wheel drive vehicle, however, it should be noted that the joints 10 of the current invention can also be used in rear-wheel drive vehicles, front-wheel drive vehicles, all-wheel drive vehicles and four-wheel drive vehicles. The driveline 12 includes an engine 14 that is connected to a transmission 16 and a transfer case 18. A front differential 20, adjacent engine 14, has a right hand front half shaft 22 and a left hand front half shaft 24, each of which are connected to a wheel 25 to deliver power to each of those wheels 25. On both ends of the right hand front half shaft 22 and the left hand front half shaft 24 are constant velocity joints 10. A front propeller shaft 27 connects the front differential 20 to the transfer case 18 and includes constant velocity joints 10 at each end. A rear propeller shaft 26 connects the transfer case 18 to a rear differential 28, where the rear differential 28 includes a right hand rear half shaft 30 and a left hand rear half shaft 32, each of which ends with a wheel 25 on one end thereof. Constant velocity joints 10 are located on both ends of the rear half shafts 30, 32 that connect to the wheels 25 and the rear differential 28. The rear propeller shaft 26, shown in FIG. 1, is a two-piece propeller shaft 26a, b that includes a cardan joint 34 and two high-speed constant velocity joints 10. The constant velocity joints 10 of the rear propeller shaft 26 transmit power to the wheels 25 even if the wheels 25 or the shaft 26 have changing angles due to steering, raising or lowering of the suspension of the vehicle. The constant velocity joints 10 may be of any of the standard types known in the art, such as plunging tripods, cross groove joints, fixed joints, fixed tripod joints, double offset joints, and the like, all of which are commonly known terms in the art for different varieties of constant velocity joints 10. The constant velocity joints 10 facilitate transmission of rotational motion at generally constant velocities for various angles which are found in everyday driving of automotive vehicles in both the half shafts and propeller shafts of these vehicles.

FIGS. 2–7 illustrate various embodiments of the constant velocity joint 10 of the present invention have a sealing system generally illustrated at 36. Generally, like numbers between the Figures represent like elements. The constant velocity joint 10 illustrated in the Figures is a traditional fixed ball joint, however, any type of joint is contemplated by the present invention. The illustrated constant velocity joint 10 of FIGS. 2–7 is generally used with the rear propeller shaft 26 of FIG. 1 in an all-wheel drive vehicle.

Specifically, the constant velocity joint 10 includes an outer race 38 which has an integral shaft 40 attached to one end thereof. In one configuration, the shaft 40 connects to the rear differential 28 of FIG. 1. In a second configuration the shaft 40 connects to the transfer case 18. An inner wall 42 of the outer race 38 generally defines a constant velocity joint chamber 44. An inner race 46 is located or housed within the outer race 38. The inner race 46 is connected to the propeller shaft 26 of the vehicle by a ring retainer 48 located on an inside surface 50 of the inner race 46. However, any type of connection to join the propeller shaft 26 to the joint 10 is contemplated by the present invention. A plurality of balls or rolling elements 52 are located between an outer surface 54 of the inner race 46 and the inner wall 42 of the outer race 38. The balls 52 are held in position between the outer race 38 and inner race 46 surfaces by a cage 56. Each ball 52 is located within tracks (not shown) of the inner wall 42 of the outer race 38. Further, each ball 52 is located within tracks (not shown) of the inner race 46. Rotation of the shaft 40 and outer race 38 rotates the inner race 46 at a generally constant speed thus allowing for constant velocity to flow through the joint 10 and between the shaft 40 and propeller shaft 26 that is disposed at an angle in relation to the shaft 40.

The sealing system 36 includes a boot cover 58 and a boot 60. The boot cover 58 is connected to an end 62 of the outer race 38. The boot 60, which is generally made of a urethane, has one end secured within a channel 64 of the boot cover 58 while an opposite end of the boot 60 engages the propeller shaft 26. Other materials for boot 60 such as hard or soft plastic, rubber, and the like are also contemplated by the present invention. The boot 60 is held in place about the propeller shaft 26 by a boot clamp 66. The sealing system 36 seals the constant velocity joint 10 from any outside contaminants, such as water, dirt and road grime. Further, the sealing system 36 maintains grease within the joint 10 to provide lubrication and resist high temperatures and friction wear common to constant velocity joints 10 rotating at high speeds. The suppleness of the boot 60 allows for a seal to be maintained to any angle of inclination that the propshaft 26 or shaft 40 may encounter during normal and off-road driving operations.

Figure 2:
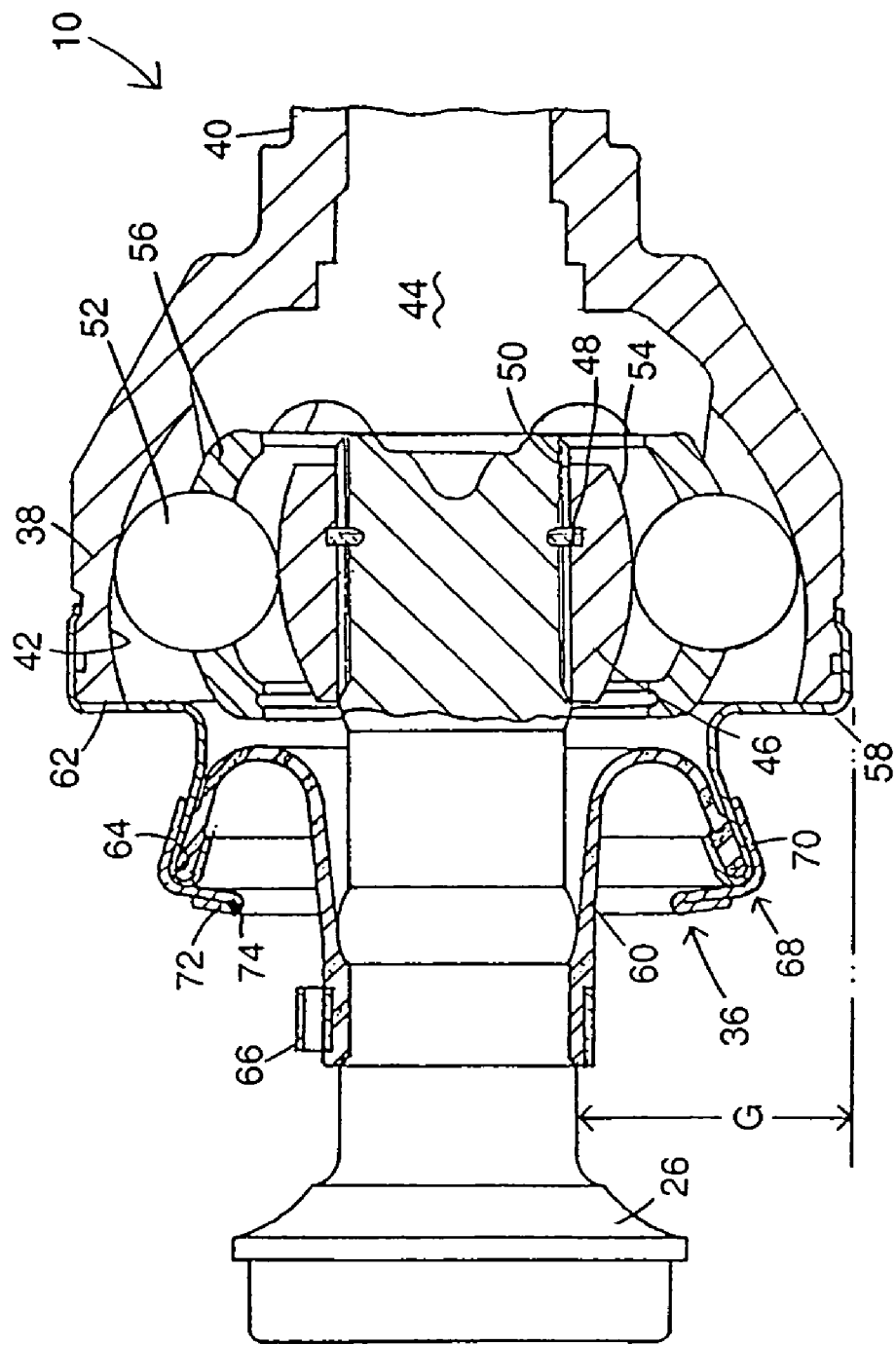
FIG. 2 is a partial cross-sectional view of a joint having a shielded sealing system according to a first embodiment of the present invention.
Figure 3:
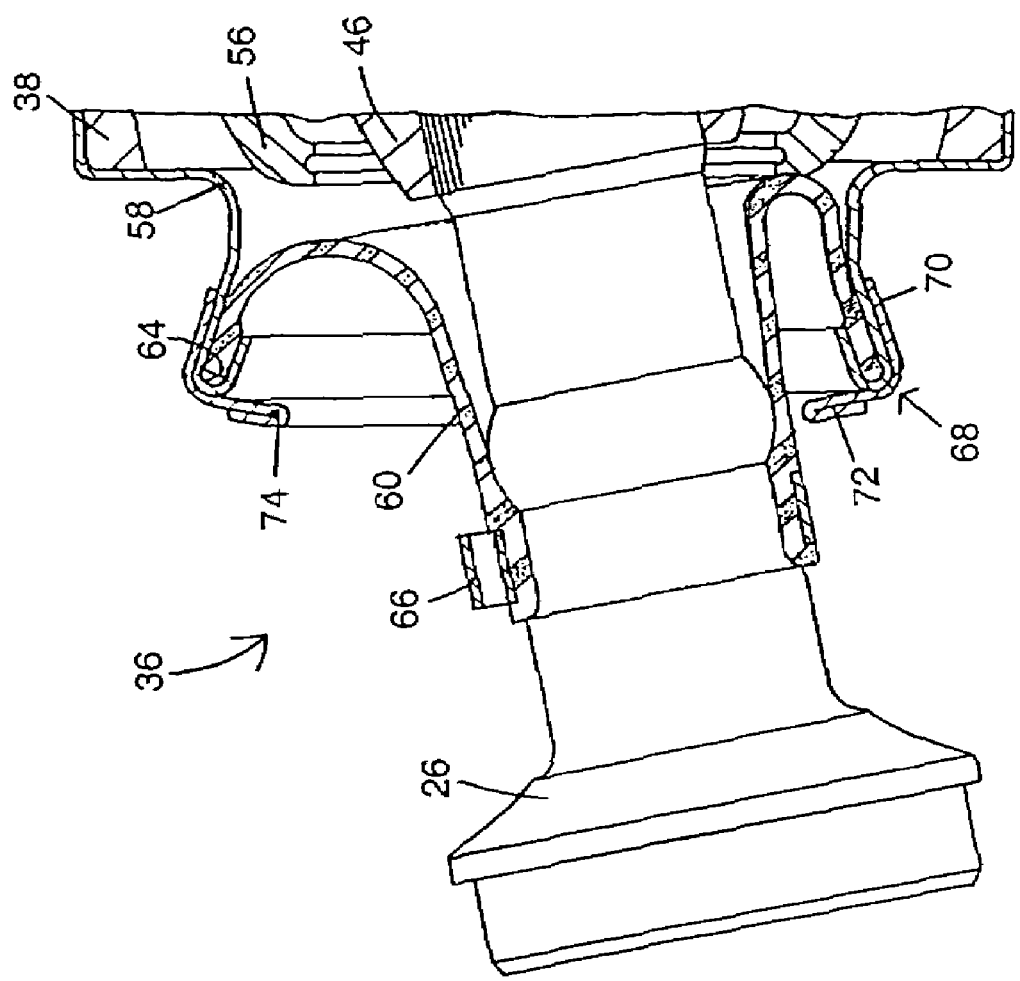
FIG. 3 is a partial cross-sectional view of the joint of the first embodiment having a shaft articulated at an operating angle.
Figure 4:
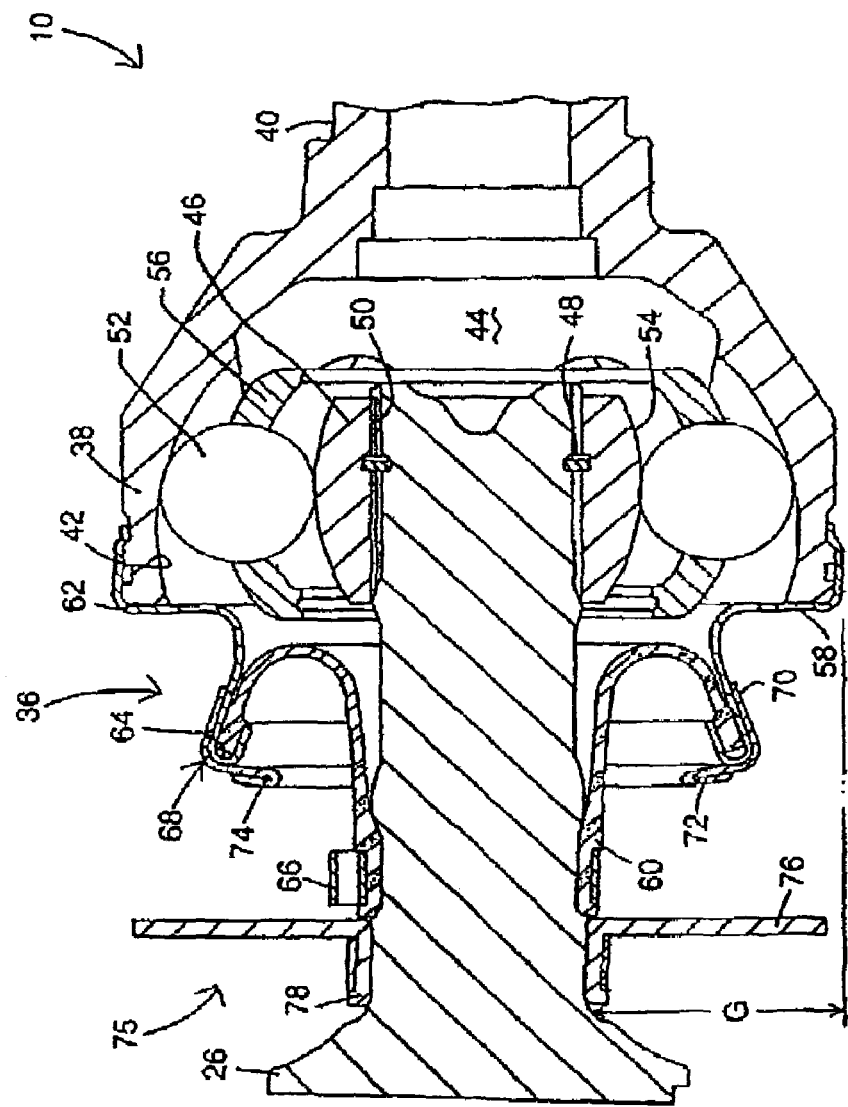
FIG. 4 is a partial cross-sectional view of the joint of the first embodiment including a deflector about the shaft.

Referring to FIGS. 2–4, a first embodiment of the constant velocity joint 10 also includes a shield 68. The shield 68 is arranged around an end of the boot cover 58. Optionally, the shield 68 can be connected directly to an outer surface of the outer race 38 if design requirements so provide. The shield 68 connects to the boot cover 58 by any connecting technique such as welding, press fitting, crimping, chemical bonding, and the like.

The shield 68 generally has a sleeve portion 70 including a reinforced end portion 72. Reinforced end portion 72 is illustrated as being reinforced by an edge that is folded-over in an outward direction to provide for a double thickness of material at the end of the sleeve 70. This folded-over region increases the stiffness of the shield 68 and increases the capability of the shield 68 to withstand the high speeds and temperatures of the constant velocity joint 10. Additionally, other techniques common for reinforcing an end portion 72 of a sleeve 70 are also contemplated by the present invention. By way of example, the reinforced end portion 72 may include a generally rigid ring 74 made of metal, plastic, a composite material, and the like. The ring 74 is a separate item disposed at the reinforced end portion 72 and encapsulated by the folded-over edge. Accordingly, the shield 68 may be one material while the ring 74 is a separate material. Shield 68 is made of any type of elastomer capable of withstanding speeds of at least 6,000 rpm and high under body temperatures of a vehicle that often exceed 120° C. Soft pliable materials such as elastomers, composites, plastics, and the like are used for the shield 68. Further, shield 68 may also be comprised of any type of metal composite or hard plastic material depending upon the overall length of the shield 68 and the operation angle of the joint 10.

Additionally, constant velocity joint 10 includes a gap, G, disposed between the propeller shaft 26 and the outer surface of the constant velocity joint 10. The gap, G, maintains separation between the shield 68 and the propeller shaft 26 when the propeller shaft 26 is articulated, even at a maximum operating angle of the joint 10. As shown in FIG. 3, the propeller shaft 26 is disposed at a maximum operating angle for the joint 10 and the shield 68 is separated from contact with the propeller shaft 26. The separation between the shield 68 and the propeller shaft 26 facilitates drainage of water, mud and debris, while still protecting sealing system 36 from exposure to contaminants.

Referring to FIG. 4, the constant velocity joint 10 of the first embodiment may optionally include a deflector 75. The deflector 75, as illustrated, has a disk 76 defining an opening therethrough and an orthogonally extending cylindrical flange 78 extends from the disk 76. The flange 78 is disposed about the propeller shaft 26 axially in front of the sealing system 36 protected by the shield 68. The flange 78 is connected to the propeller shaft 26 via any known fastening techniques common in the art. The deflector 75 extends a predetermined radial distance to help protect the sealing system 36 from contact with contaminants. The deflector 75 may be made of any rigid material such as metal, plastic, composites and the like. Rigid materials, along with the configuration of the deflector 75, assist with the deflector 75 withstanding the high speed and high temperature environment of the constant velocity joint 10. The more rigid the material, the less likely the deflector 75 will become unstable and eccentric.

The shield 68 reduces the area of the sealing system 36 exposed to contaminants and thus reduces or prevents the impact of foreign objects upon the sealing system 36. Accordingly, the useful life of the sealing system 36 and the useful life of the constant velocity joint 10 are increased. Therefore, many designs or variations of the shield 68 are contemplated by the present invention as a result of changes in sizes and shapes of various features of the shield 68. Meanwhile, the illustrated embodiment of FIG. 4 shows a combined deflector 75 and shield 68 to reduce exposure of the sealing system 36 to contaminants. It is further contemplated to only incorporate the deflector 75 and not include the shield 68 to continue to reduce exposure of the sealing system while utilizing a minimal amount of material. Further, while deflector 75 is illustrated as a disk 76 having a flange 78, any other shape of defector 75 that minimizes exposure of the sealing system 36 to contaminants is contemplated by the present invention.

Figure 5:
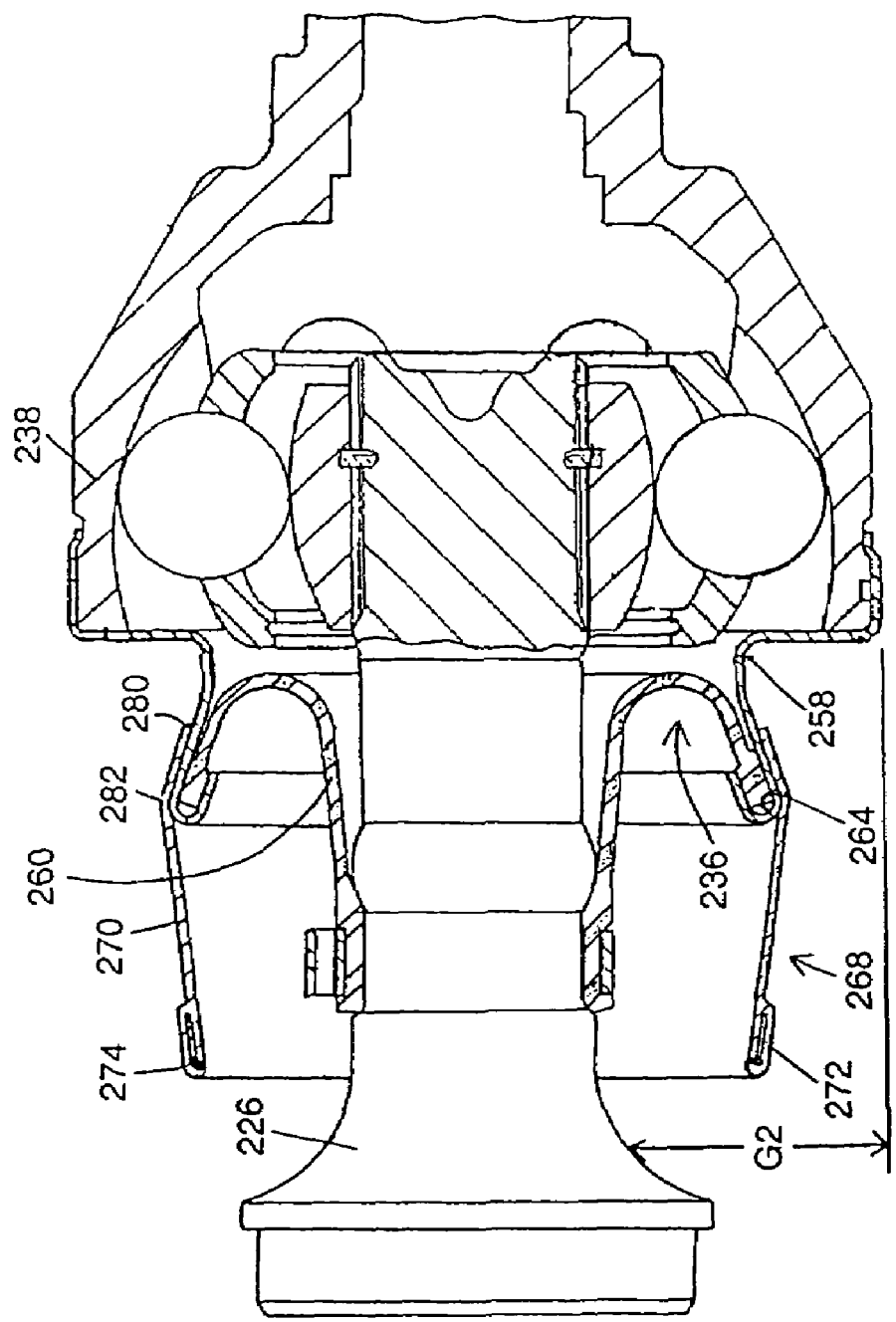
FIG. 5 is a partial cross-sectional view of a joint having a shielded sealing system according to a second embodiment of the present invention.
Figure 6:
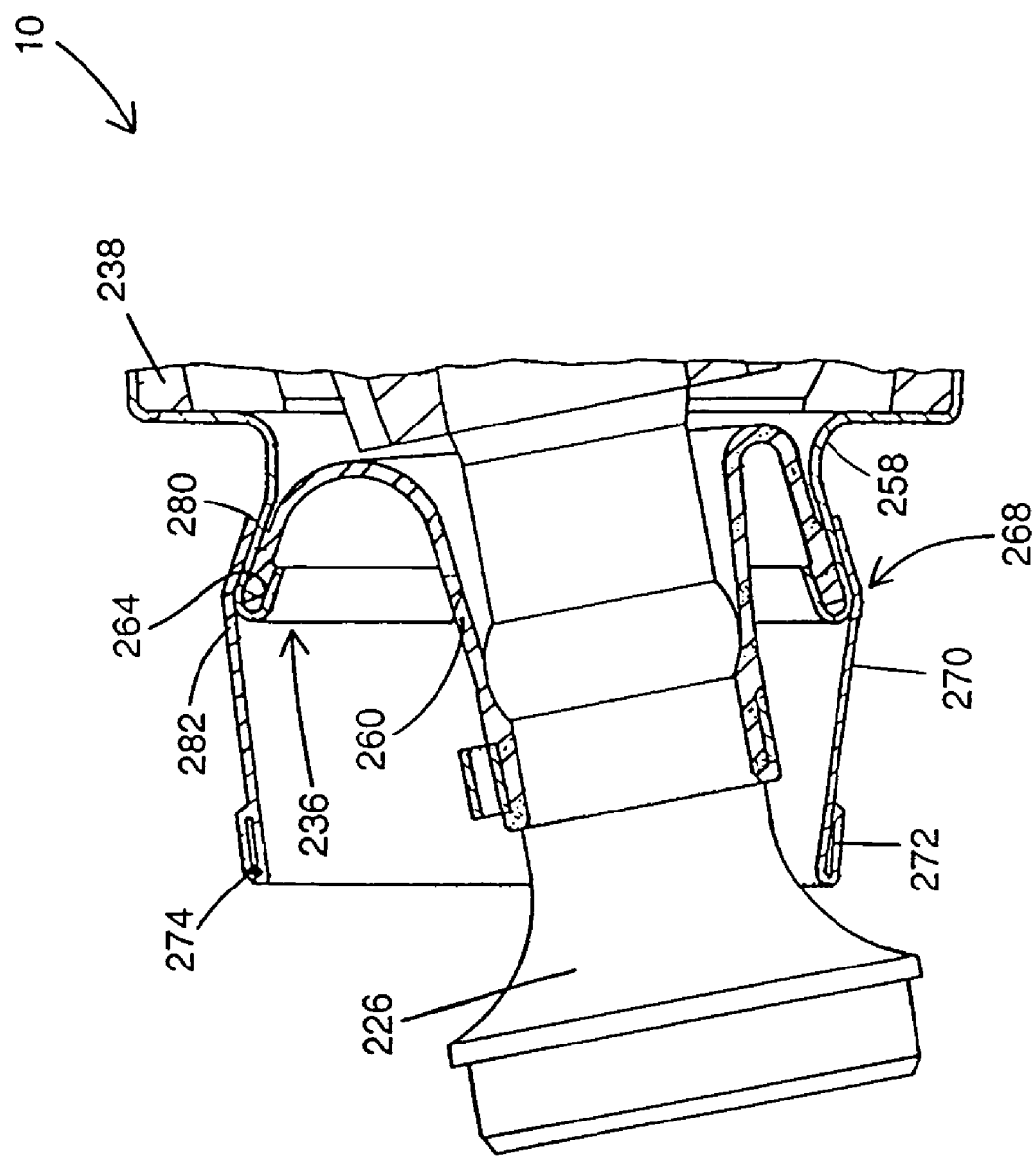
FIG. 6 is a partial cross-sectional view of the joint of the second embodiment having a shaft articulated at an operating angle.

Now referring to FIGS. 5–6, a second embodiment of the constant velocity joint 10 having a shield 268 is illustrated wherein like numbers throughout the figures refer to like elements. The shield 268 of the second embodiment is generally similar to the shield 68 of the first embodiment; however, a tube 270 replaces sleeve 70. The tube 270 is generally cylindrical and includes a first end 280 secured to the boot cover 258. Optionally, the shield 268 can be connected directly to an outer surface of the outer race 238 if design requirements so provide. The shield 268 connects to the boot cover 258 by any connecting technique such as welding, press fitting, crimping, chemical bonding, and the like.

The cylindrical tube 270 includes a reinforced end portion 272. The reinforced end portion 272 is illustrated as being reinforced by an edge that is folded-over in an outward direction to provide for a double thickness of material at the end of the tube 270. This folded-over region increases the stiffness of the shield 268 and increases the capability of the shield 268 to withstand the high speeds and temperatures of the constant velocity joint 10. Additionally, other techniques common for reinforcing the end portion 272 of the tube 270 are also contemplated by the present invention. By way of example, the reinforced end portion 272 may include a generally rigid ring 274 made of metal, plastic, a composite material, and the like. The ring 274 is a separate item disposed at the reinforced end portion 272 and encapsulated by the folded-over edge. Accordingly, the shield 268 may be one material while the ring 274 is a separate material. Shield 268 is made of any type of elastomer capable of withstanding speeds of at least 6,000 rpm and high under body temperatures of a vehicle that often exceed 120° C. Soft pliable materials such as elastomers, composites, plastics, and the like are used for the shield 268. Further, shield 268 may also be comprised of any type of metal composite or hard plastic material depending upon the overall length of the shield 268 and the operation angle of the joint 10.

Additionally, constant velocity joint 210 includes a gap, G2, disposed between the propeller shaft 226 and the outer surface of the constant velocity joint 10. The gap, G2, maintains separation between the shield 268 and the propeller shaft 226 when the propeller shaft 226 is articulated, even at a maximum operating angle of the joint 10. As shown in FIG. 6, the propeller shaft 226 is disposed at a maximum operating angle for the joint 10 and the shield 268 is separated from contact with the propeller shaft 226. The separation between the shield 268 and the propeller shaft 226 facilitates drainage of water, mud and debris, while still protecting sealing system 236 from exposure to contaminants.

A distinguishing feature of the second embodiment of FIGS. 5 and 6 is the axial length of the cylindrical tube 270 of the shield 268. The cylindrical tube 270 of the second embodiment is generally longer than the axial length of the sleeve 70 of the first embodiment. The length of cylindrical tube 270 is generally dependent upon the maximum operating angle of the constant velocity joint 10. The shield 268 extends over the boot cover 258 and the boot 260 that is connected to the shaft 226. Therefore, the shield 268 completely covers the boot 260 and provides protection thereto in the constant velocity joint 210 environment. Further, the cylindrical tube 270 has a gradually reducing diameter from a mid-portion 282 to the first end 280 and to the reinforced end portion 272. As illustrated, the cylindrical tube 270 has its widest diameter near the mid-portion 282 thereof and adjacent a channel 264 of the boot cover 258. The smaller diameters of the cylindrical tube 270 are disposed at the reinforced end portion 272 and the first end 280. Further, it is also contemplated to have the cylindrical tube 270 of the shield 268 one predetermined diameter for the entire axial length.

The shield 268 reduces the area of the sealing system 236 exposed to contaminants and thus reduces or prevents the impact of foreign objects upon the sealing system 236. Accordingly, the useful life of the sealing system 236 and the useful life of the constant velocity joint 10 are increased. Therefore, many designs or variations of the shield 268 are contemplated by present invention as a result of changes in sizes and shapes of various features of the shield 268.

Figure 7:
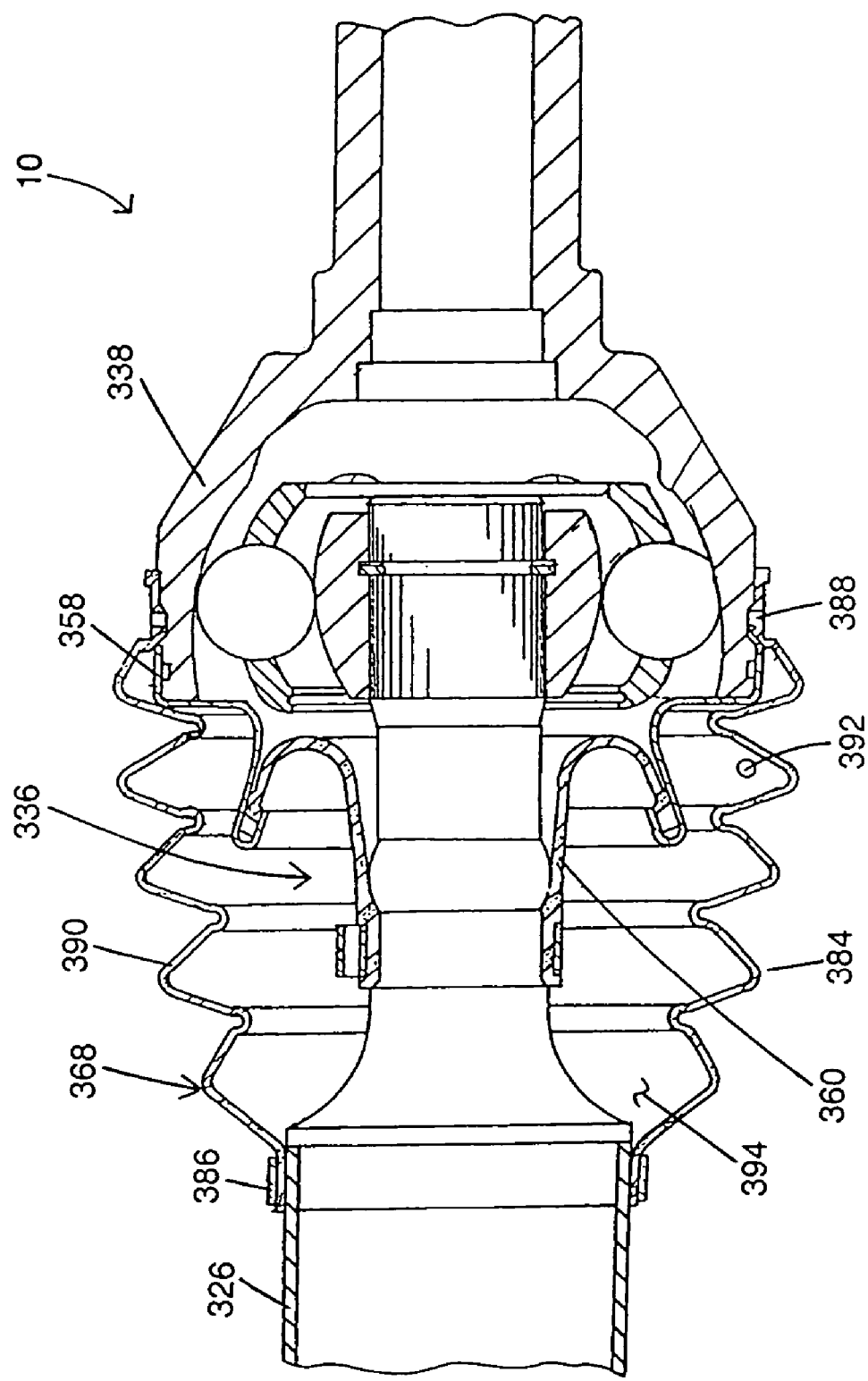
FIG. 7 is a partial cross-sectional view of a joint having a shielded sealing system according to a third embodiment of the present invention.

Now referring to FIG. 7, a third embodiment of constant velocity joint 10 is illustrated wherein like numbers throughout the figures refer to like elements. The constant velocity joint 10 includes a shield 368 that is disposed between the outer race 338 of the joint 10 and the propeller shaft 326. Further, the shield 368 may be connected directly to the boot cover 358 if design requirements so provide. The shield 368 is a second boot 384 that creates a boot-in-boot arrangement to protect the interior boot 360 and constant velocity joint 10. The second boot 384 is connected to the propeller shaft 326 by any fastening technique generally known in the art. As illustrated, the second boot 384 is fastened to the propeller shaft 326 by a clamp 386. The opposite end of the second boot 384 is secured to the outer race 384 by any fastening technique generally known in the art. In the illustrated embodiment, the second boot is secured to the outer race 338 by a boot clamp 388.

In the illustrated embodiment, the second boot 384 will cover and completely seal off the more fragile interior boot 360 from contact with any contaminants found in the environment of the vehicle. Optionally, thermoplastic, hard or soft plastic, metal, composite, fabric, and the like, may be used for the second boot 384 of the present invention. The second boot 384 is preferably made of a thermoplastic material, which is much more durable than the traditional material of interior boot 360. Accordingly, second boot 384 provides a larger area to absorb the impact of contaminants to protect the sealing system 336 while not requiring an increase in the amount of lubricant. Instead, the lubricant, typically a grease, remains contained within the interior boot 360. The use of this second boot 384 protects the interior boot 360 through even the most abusive of situations and environments a vehicle may encounter in normal and off-road conditions.

As illustrated, the second boot 384 has a plurality of bellows 390 along the surface of its entire axial length. The second boot 384 also has a shape that is generally convex as compared to concave. In contrast, the interior boot 360 has a generally concave shape and may accumulate or capture debris therein without the incorporation of the shield 368. The convex shape for the second boot 384 eliminates the collection of contaminants about the constant velocity joint 10 including the boot cover 358, boot 360 and other connections on the constant velocity joint 10 between the outer race 338 and the propeller shaft 326. The elimination of contaminants about the joint 10 will thus further reduce any wear on the constant velocity joint 10 and increase the useful life of the constant velocity joint 10. Hence, the propeller shaft 326 and constant velocity joint 10 of the automotive vehicle are improved in both normal road conditions and off-road conditions.

In some specific applications the second boot 384 is vented to allow pressures built up within the second boot 384 to equalize on both the inside and outside of the shield 368. The vent as illustrated in FIG. 7, takes the form of a small orifice 392 or a small slit 394 through the second boot 384. The incorporation of the orifice 392 and the slit 394 may be utilized alone or in combination. Further, the orifice 392 or slit 394 may be formed or machined into the thermoplastic material on the second boot 384. Therefore, the second boot 384 will create a generally impenetrable shield 368 for the constant velocity joint 10 thus greatly increasing the service life and robustness of the constant velocity joint 10 in both the normal and off-road environments.

The boot shields 68, 268 and 368 of each embodiment protect the sealing systems 36, 236, and 336 from exposure to contaminants and thus greatly increase the useful life, robustness and efficiency of the constant velocity joint 10 by preventing impact of foreign objects with the sealing systems 36, 236, 336. The shields 68, 268, 368 prevent the sealing systems 36, 236, 336 from becoming compromised, thus the grease used to lubricate the interior of the constant velocity joint 10 will not leak or become contaminated. Accordingly, the useful life of the propeller shafts 26, 226, 326 increases because the constant velocity joints 10 will operate with increased longevity and more robustness. Therefore, many designs or variations of the shield 68, 268, 368 are contemplated by changing various dimensions and surface configurations. Various changes are contemplated by the present invention to further increase the effectiveness and protection offered by the shields 68, 268, 368 to the constant velocity joint 10, and specifically the sealing systems 36, 236, 336.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

What is claimed is:

1. A joint receiving a shaft, said joint comprising:
    a sealing system including a boot cover and a boot wherein a portion of said boot is secured by said boot cover; and
    a shield, secured to said sealing system, wherein said shield includes a sleeve portion, said shield overlaps a portion of said boot cover that secures said portion of said boot, said sleeve portion includes an end portion at least partially defined by a sleeve surface, said end portion is folded to form a generally toroidal fold such that at least a first portion of said sleeve surface engages a second portion of said sleeve surface, said shield includes said sleeve portion secured to said boot cover wherein said sleeve overlaps said portion of said boot cover that secures said portion of said boot, said sleeve portion includes a generally reinforced end portion, and wherein said sleeve portion includes a ring interposed within said toroidal fold.

2. The joint according to claim 1, wherein a gap is disposed between said shield and the shaft to maintain separation between the shaft and said shield when the shaft is disposed at one of a plurality of angles.

3. The joint according to claim 1, further including a deflector generally disposed about said shaft.

4. A joint receiving a shaft, said joint comprising:
    a sealing system having a boot and boot cover;
    a shield, secured to said sealing system, wherein said shield overlaps a portion of said boot cover that secures said portion of said boot; and
    wherein said shield includes a sleeve portion secured to said boot cover and wherein said sleeve portion includes an end portion at least partially defined by a sleeve surface, said end portion is folded such that at least a first portion of said sleeve surface engages a second portion of said sleeve surface, and further comprising a ring at least partially interposed between said first portion and said second portion.

5. The joint according to claim 4, wherein said ring is encased in said sleeve surface.

6. The joint according to claim 4, wherein said ring is generally rigid.

7. The joint according to claim 4, wherein said sleeve portion is elastomeric.

8. The joint according to claim 4, wherein a gap is disposed between said shield and the shaft to maintain separation between the shaft and said shield when the shaft is disposed at one of a plurality of angles.

9. The joint according to claim 4, further including a deflector generally disposed about the shaft and extending radially outwardly.

10. The joint according to claim 9, wherein said deflector is generally rigid.

* * * * *